Dec. 31, 1957    B. E. RICHET    2,817,991
PROFILING ATTACHMENT AND/OR SYSTEM FOR A MACHINE TOOL
Filed Feb. 25, 1953    2 Sheets-Sheet 1

INVENTOR.
BERNARD E. RICHET
BY R. W. Hodgson

Dec. 31, 1957        B. E. RICHET        2,817,991
PROFILING ATTACHMENT AND/OR SYSTEM FOR A MACHINE TOOL
Filed Feb. 25, 1953        2 Sheets-Sheet 2

INVENTOR.
BERNARD E. RICHET
BY R. W. Hodgson

United States Patent Office 2,817,991
Patented Dec. 31, 1957

2,817,991

PROFILING ATTACHMENT AND/OR SYSTEM FOR A MACHINE TOOL

Bernard E. Richet, North Hollywood, Calif.

Application February 25, 1953, Serial No. 338,635

2 Claims. (Cl. 82—14)

Generally speaking, the present invention relates to a profiling attachment and/or system for use with any of a great number of types of standard machine tools, and which makes it possible for a cutting tool bit to be positionally controlled in exact accordance with a template having a predetermined variable width profile.

This application is a continuation-in-part of my copending parent patent application entitled a Profiling Attachment and/or System for a Machine Tool, Serial No. 280,915, filed April 7, 1952, now Patent No. 2,782,668 issued February 26, 1957.

I am aware of the fact that several prior art attempts to develop an automatic profiling machine tool and/or attachment for a machine tool, have been made heretofore. However, all of these prior art systems known to me have various major disadvantages of one type or another.

The prior art mechanical systems have been too complicated, costly and critical as to adjustment, and certain systems employing electronic and digital techniques working from coded information-supplying means indicating the desired profile, are extremely costly and difficult to maintain in operative condition.

Furthermore, they require the services of a highly skilled electronics and/or digital techniques engineer to maintain and/or, in certain cases, to operate them.

Generally speaking, the present invention includes a base member adapted to be mounted upon movable tool post base means of a machine tool. Also included is a tool bit carrying slide member slidably mounted with respect to the base member. Also included is fastening means (usually adjustable and/or movable) cooperable with the tool bit carrying slide member for fastening (usually adjustably, removably fastening) a cutting tool bit in a selected, projecting, operative position. Also included is a template engaging member carried by the base member and adapted to movably engage a reference edge (usually the rear edge) of a variable width template. Follower means is carried by the tool bit carrying slide member for movable engagement with respect to the guiding edge (usually the front edge) of the variable width template whereby movement of the template engaging member and the follower means along the reference edge and the guiding edge, respectively, of the variable width template will cause slidable movement of the tool bit carrying slide member and the cutting tool bit carried thereby in a manner corresponding to the variable width of the template positioned between the template engaging member and the follower means.

In the preferred general form of the present invention, biasing means is also included and is adapted for use in biasing the follower means into forced engagement with respect to the guiding edge of the variable width template and for use in biasing the template engaging member into forced engagement with respect to the reference edge of the variable width template.

From the above general description of the basic form of the present invention, it will be apparent to those skilled in the art that virtually all of the hereinabove mentioned prior art disadvantages are virtually entirely eliminated and overcome in and through the use of the present invention.

With the above points in mind, it is an object of the present invention to provide a novel profiling attachment for a machine tool including a base member and a slidable tool bit carrying member effectively, relatively positionally controlled by a variable width template.

It is a further object of the present invention to provide an attachment of the character set forth in the preceding object, which positively includes the variable width template as a part of the system.

It is a further object of the present invention to provide a device of the character set forth in either or both of the preceding objects, including biasing means for effectively biasing a follower means, carried by the slidable member, into engagement with a guiding edge of the template and for effectively biasing a template engaging member, carried by the base member, into engagement with a reference edge of the template.

Other and allied objects will become apparent to those skilled in the art after a careful perusal, examination and study of the accompanying illustrations, the present specification and the appended claims.

To facilitate understanding, reference will be made to the hereinbelow described drawings, in which.

Figure 1:
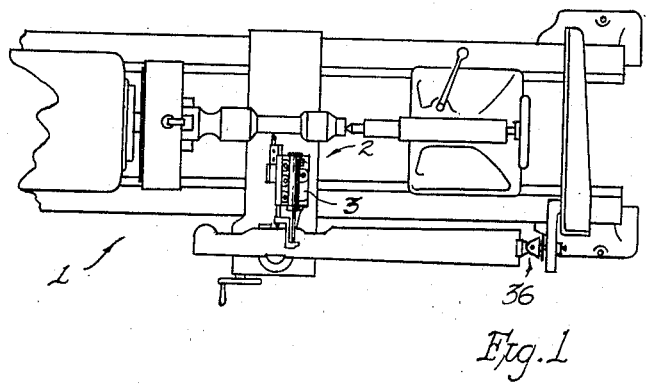
Fig. 1 is a diagrammatic, schematic, fragmentary, top plan view of one embodiment of the present invention in mounted, operative position with respect to a lathe.
Figure 2:
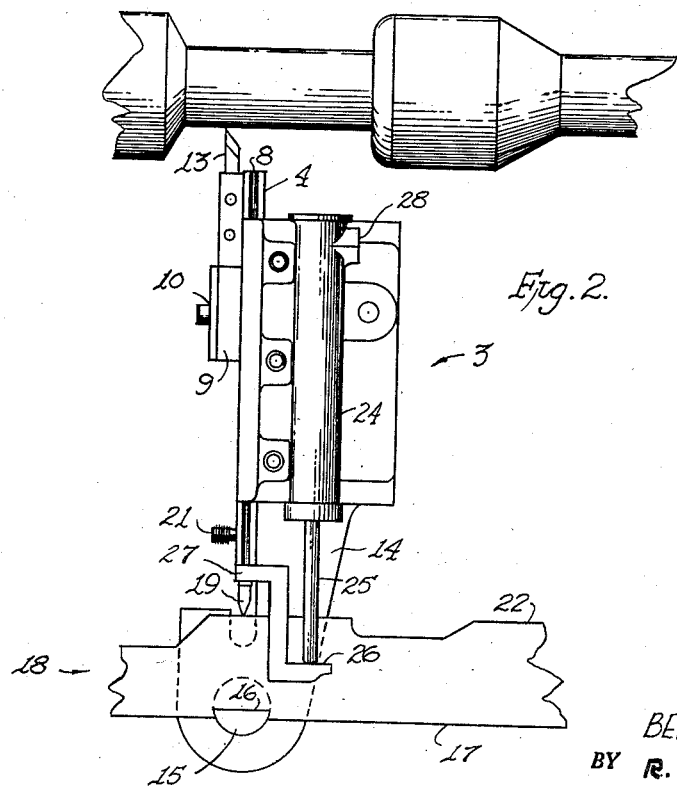
Fig. 2 is a relatively enlarged, fragmentary, top plan view, similar in aspect to Fig. 1. In this view, both the work and the template are shown broken away.
Figure 3:
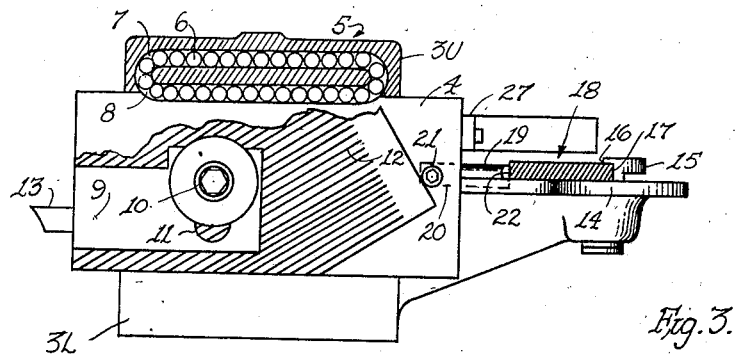
Fig. 3 is a relatively enlarged, fragmentary view, partly in elevation and partly in vertical section, illustrating the device. This view does not show the machine tool which is adapted to carry the device.
Figure 4:
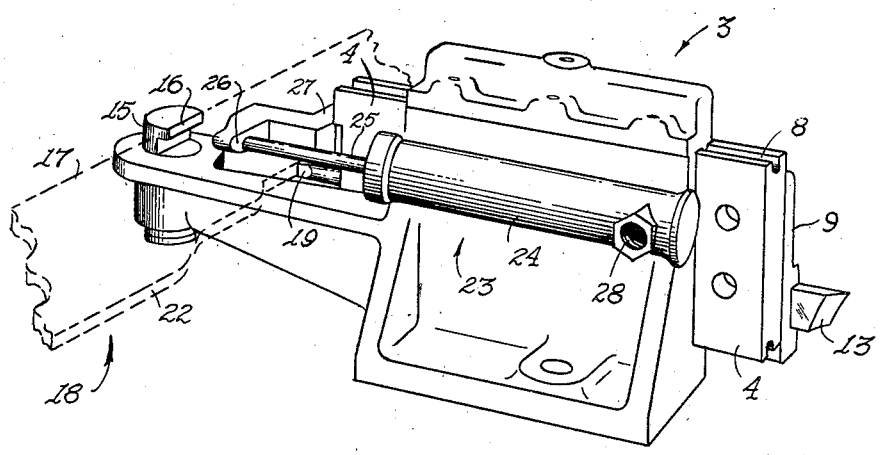

Fig. 4 is a perspective view of the embodiment of the present invention shown in Figs. 1, 2 and 3. The machine tool which is adapted to mount the device is not shown for reasons of clarity. The variable width template is shown, in dotted lines, in fragmentary form.

Figure 5:
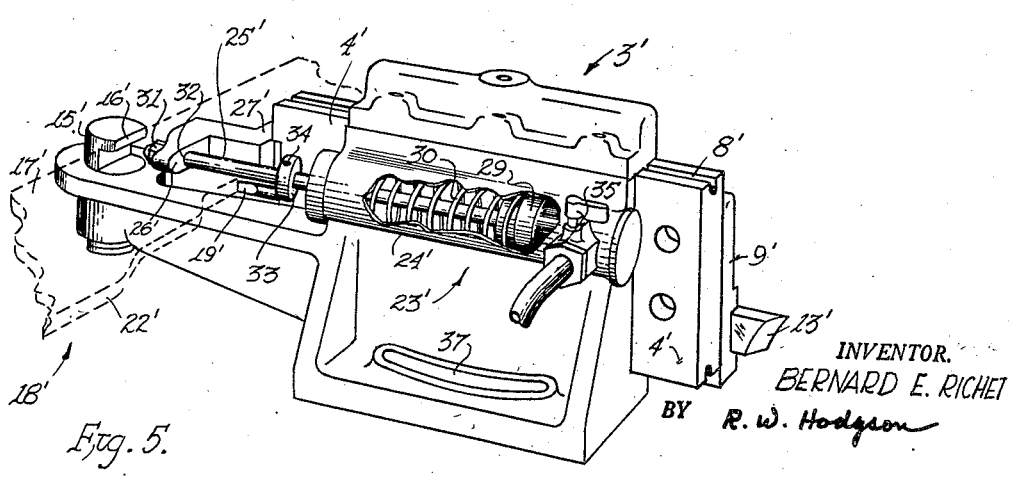

Fig. 5 is a perspective view, similar in aspect to Fig. 4, illustrating a slightly modified form of the present invention.

Generally speaking, the present invention includes a base member adapted to be mounted upon movable tool post base means of a machine tool, and provided with a tool bit carrying slide member slidably mounted with respect to the base member.

In the specific example illustrated in Figs. 1 through 4, inclusive, a machine tool is indicated generally at 1, and comprises a lathe, which includes a tool post base means, indicated generally at 2, carrying (usually by threaded fastening means such as bolts) a base member 3, which is laterally recessed and slidably carries a slidable member 4 therein between the upper portion 3U and the lower portion 3L of the base member.

In the specific example illustrated, anti-friction means, indicated generally at 5 in Fig. 3, is provided and is effectively positioned between the slidable member 4 and the base member 3 so as to facilitate relative movement therebetween. In the specific example illustrated, the anti-friction means 5 comprises a plurality of preloaded ball bearings 6 positioned in the enclosure 7 for circulating movement therethrough and along the groove 8 in the top of the slidable member 4. It will be understood that a similar anti-friction means may be positioned between the lower portion 3L of the base member and the bottom of the slidable member 4 in a generally similar manner. Or if desired, this may be eliminated in certain cases. This is not shown because the upper antifriction device fully illustrates the principles involved. It will be understood that the pre-loaded ball bearings 6 travelling in race-ways effectively eliminate all play and/or back lash.

The tool bit carrying slide member is also provided with fastening means cooperable therewith for fastening a cutting tool bit in a selected, projecting, operative position.

In the specific example illustrated, this takes the form of a member 9 and selectively engageable locking means 10 cooperable therewith. The member 9 is provided with a slot 11 whereby it can be vertically positionally adjusted, and then can be locked in the adjusted position for retaining the cutting tool bit 13 in a selected position, as illustrated. The face surface of the slidable member 4 (and/or the engaging face surface of the member 9) can be provided with grooves, such as are indicated at 12, for the purpose of facilitating the adjustable locking engagement of the member 9 in a selected position with respect to the slidable member 4 so as to hold the cutting tool bit 13 in a selected position.

Generally speaking, the present invention also includes a template engaging member carried by the base member and adapted to movably engage a reference edge of a variable width template.

In the specific example illustrated, this template engaging member comprises an extension arm portion 14, which is rearwardly directed and provided with a rotatable upwardly directed portion 15 having a straight overhanging engaging edge 16 adapted to slidably movably engage the rear reference edge 17 of a template, indicated generally at 18, which is pivotally mounted with respect to the lathe 1 adjacent one end, as indicated at 36. It will be noted that, in the specific example illustrated, the rearwardly extending arm portion 14 effectively supports the template 18.

Also, generally speaking, follower means is carried by the tool bit carrying slide member for movable engagement with respect to the guiding edge of a variable width template.

In the specific example illustrated, this follower means is indicated at 19 and is adjustably mounted in a rearwardly projecting direction in a hole 20 in the rear of the slide member 4 and is positionally adjustable by means of adjusting screw means 21.

It will be noted that the rear end of the follower 19 is in slidably movable engagement with respect to the irregular front guiding edge 22 of the template 18 and is positioned directly opposite the center of the engaging portion 16 of the template engaging means 15 carried by the base member 3 whereby they will be positioned apart on opposite edges 22 and 17, respectively, of the template 18 a distance equal to the variable width of said template 18.

Also generally speaking, biasing means is included and is arranged for use in effectively biasing the follower means into forced engagement with respect to the guiding edge of the variable width template and for use in biasing the template engaging means into forced engagement with respect to the reference edge of the variable width template.

In the specific example illustrated, the pressure responsive fluid motor biasing means is indicated generally at 23 (as best seen in Fig. 4) and comprises a longitudinal hollow cylinder 24 adapted to contain a piston (not shown) connected to a connecting rod 25 by means of a connecting rod outlet hole (not shown). The outer end of the connecting rod 25 is adapted to abut and make effective mechanical contact with a projecting member 26, which is mechanically fastened by suitable bracket means 27 to the rear end of the slidable member 4, whereby left-ward actuation of the connecting rod 25 caused by left-ward actuation of the piston in the cylinder 24, caused by the introduction of a pressurized fluid (usually air) through the fitting 28, causes the slidable member 4 to be rearwardly biased, resulting in the rearward biasing of the follower 19 so as to cause forced engagement of the rear end of the follower 19 with the front guiding edge 22 of the tempalte 18 while causing engagement of the template engaging member 16 with the rear reference edge 17 of the template 18. In other words, the relative position of the slidable member 4 and the base member 3 will, at all times, be determined by the distance across the template 18 between the tip of the follower means 19 and the engaging edge 16 of the template engaging means 15 carried by the base member 3.

From the above description, the operation of the device is obvious and, therefore, will not be further described.

Fig. 5 illustrates a slightly modified form of the biasing means of the invention. Similar portions of the invention will be indicated by similar reference numerals, primed however. New structural components will be indicated by new reference numerals.

In this version of the invention, the pressure responsive fluid motor means is indicated generally at 23', and comprises a longitudinal hollow cylinder 24' adapted to contain a piston 29 (not shown in Fig. 4 of the first form of the biasing means, but also present therein) and a compression spring 30 abutting said piston 29 to provide a rightward force on said piston. The piston 29 is connected to a connecting rod 25' which extends leftwardly through a connecting rod outlet hole (not shown) to the exterior of the cylinder 24'. The outer end of the connecting rod 25' extends through the projecting member 26' and is adapted to make effective mechanical engagement therewith by means of a nut 31 on the extreme end of a reduced section face 32 on the connecting rod 25'. A stop washer 33 is positioned on the connecting rod 25' in slidable relation thereto. A locking screw 34 extends through the stop washer 33 whereby the stop washer 33 may be locked in immovable relation to the connecting rod 25' at any predetermined position along the length thereof. The fitting 28' is provided with a two-way valve 35 for the introduction and escape of a pressurized fluid (usually air). A curved mounting slot 37 in the base member 3' permits rotation of the entire device with respect to the work (not shown in Fig. 5), the template engaging means 15' being freely pivotal so as to engage the rear reference edge 17' of the template 18' at all times.

The introduction of a pressurized fluid through the valve 35 causes leftward actuation of the piston 29 in the cylinder 24' causing leftward actuation of the connecting rod 25', causing the slidable member 4' to be rearwardly biased in the same manner as the rearward biasing of the slidable member 4 in the first form of the present invention. By turning the two-way valve 35, the incoming pressurized fluid (usually air) is prevented from entering the cylinder 24' and the fluid already present therein is released, permitting the compression spring 30 to actuate the piston 29 and the connecting rod 25' in a rightward direction until the stop washer 33 terminates the movement, the result being the disengagement of the follower 19' from the front guiding edge 22' of the template 18' by a small clearance when the follower 19' encounters a sharp corner (for example, 90 degree angle) in the front guiding edge 22'.

In other respects the modified form of the present invention illustrated in Fig. 5 is similar to the first form of the present invention illustrated in Figs. 1 through 4, inclusive. Therefore, no further description of the modified form of the invention is thought necessary.

Numerous modifications and variations of the present invention will occur to those skilled in the art after a careful study hereof. All such properly within the spirit and scope of the present invention, are intended to be included and comprehended herein as fully as if specifically described, illustrated, and claimed herein.

For example, it should be understood that the structure of the base means and the slidable means can be modified substantially from that specifically described and illustrated herein. Any relatively movable arrangement for the two members can be employed. It should also be noted that the anti-friction means can be substantially modified or, under certain circumstances, dispensed with entirely.

It should also be noted that the follower means and the template engaging means can be substantially modified and, if desired, can be relatively positionally reversed.

The means for effectively biasing the follower means and/or the template engaging means against corresponding edges of the template can be modified substantially from that described and illustrated herein. It may comprise pressure means of virtually any desired type, weight means, spring means, or any other suitable means.

It should also be noted that the mounting of the template and the relative positioning of the reference edge and the guiding edge of the template can be substantially modified.

The fastening means for effectively fastening a cutting tool bit (which can be of any suitable type) can be adjustable or non-adjustable and can be modified substantially from that specifically described and illustrated herein.

The means for mounting the entire device can be modified substantially.

The exact compositions, configurations, relative positionings and cooperative relationships of the various component parts of the present invention are not critical and can be modified substantially within the spirit hereof.

The embodiments of the present invention specifically described and illustrated herein are exemplary only and are not intended to limit the scope of the present invention, which is to be interpreted in the light of the prior art and the appended claims only, with due consideration for the doctrine of equivalents.

I claim:

1. A profiling attachment for a machine tool having a movable tool post base means, comprising: a variable width template having a reference edge and a guiding edge, said template being adapted to be effectively mounted in operative position with respect to a machine tool; a base member adapted to be mounted upon movable tool post base means of a machine tool; a tool bit carrying slide member slidably mounted with respect to the base member; fastening means cooperable with the tool bit carrying slide member for fastening a cutting tool bit in a selected projecting operative position with respect to the tool bit carrying slide member; a template engaging member carried by the base member and cooperable to slidably movably engage a reference edge of a variable width template; follower means carried by the tool bit carrying slide member for movable engagement with respect to a guiding edge of the variable width template, whereby movement of the template engaging member and the follower means along the reference edge and the guiding edge, respectively, of the variable width template will cause slidable movement of the tool bit carrying slide member and the cutting tool bit carried thereby in a manner corresponding to the width of the template positioned between the template engaging member and the follower means; pressure responsive fluid motor means effectively mechanically linked between the base member and the tool bit carrying slide member for effectively biasing the follower means carried by said slide member into forced engagement with respect to the guiding edge of the variable width template and thereby effectively biasing the reference edge of the variable width template into forced engagement with respect to the template engaging member; biasing means effectively mechanically linked between the base member and the follower means for effectively biasing said follower means away from the guiding edge of the template during selective effective inactivation of the pressure responsive fluid motor means; and selectively adjustable stop means effectively mechanically positioned with respect to the relatively movable base member and follower means to selectively control the amplitude of movement of said follower means away from the guiding edge of the template during selective effective inactivation of the pressure responsive fluid motor means.

2. A profiling attachment for a machine tool having a movable tool post base means and provided with a variable width template having a reference edge and a guiding edge, said template being adapted to be effectively mounted in operative position with respect to the machine tool, comprising: a base member adapted to be mounted upon movable tool post base means of a machine tool; a tool bit carrying slide member slidably mounted with respect to the base member; fastening means cooperable with the tool bit carrying slide member for fastening a cutting tool bit in a selected projecting operative position with respect to the tool bit carrying slide member; a template engaging member carried by the base member and cooperable to slidably engage a reference edge of a variable width template; follower means carried by the tool bit carrying slide member for movable engagement with respect to a guiding edge of the variable width template, whereby movement of the template engaging member and the follower means along the reference edge and the guiding edge, respectively, of the variable width template will cause slidable movement of the tool bit carrying slide member and the cutting tool bit carried thereby in a manner corresponding to the width of the template positioned between the template engaging member and the follower means; first biasing means effectively mechanically linked between the base member and the follower means for effectively biasing said follower means into forced engagement with respect to the guiding edge of the variable width template and thereby effectively biasing the reference edge of the variable width template into forced engagement with respect to the template engaging member; second biasing means effectively mechanically linked between the base member and the follower means for effectively biasing said follower means away from the guiding edge of the template during selective effective inactivation of the first biasing means; and selectively adjustable stop means effectively mechanically positioned with respect to the relatively movable base member and follower means to selectively control the amplitude of movement of said follower means away from the guiding edge of the template during selective effective inactivation of the first biasing means.

References Cited in the file of this patent

UNITED STATES PATENTS

| | | |
|---|---|---|
| 43,311 | Jillson | June 28, 1864 |
| 1,031,726 | Mills | July 9, 1912 |
| 1,195,293 | Townsend | Aug. 22, 1916 |
| 1,206,528 | Goddu | Nov. 28, 1916 |
| 1,635,285 | Lovely | July 12, 1927 |
| 1,875,486 | Peaslee | Sept. 6, 1932 |
| 1,978,990 | Cross | Oct. 30, 1934 |
| 2,092,202 | Bennett | Sept. 7, 1937 |
| 2,462,126 | Peat | Feb. 22, 1949 |
| 2,540,323 | Cross | Feb. 6, 1951 |